(12) United States Patent
Rebrovic et al.

(10) Patent No.: US 10,976,079 B2
(45) Date of Patent: Apr. 13, 2021

(54) CARBON DIOXIDE REFRIGERANT SYSTEM

(71) Applicant: Emerson Climate Technologies, Inc., Sidney, OH (US)

(72) Inventors: Louis Rebrovic, New Bremen, OH (US); Kyaw Wynn, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 16/399,149

(22) Filed: Apr. 30, 2019

(65) Prior Publication Data

US 2020/0348051 A1    Nov. 5, 2020

(51) Int. Cl.
| | | |
|---|---|---|
| *C09K 5/04* | (2006.01) | |
| *F25B 9/00* | (2006.01) | |
| *C10M 105/60* | (2006.01) | |
| *C10N 40/30* | (2006.01) | |

(52) U.S. Cl.
CPC .............. *F25B 9/006* (2013.01); *C09K 5/041* (2013.01); *C10M 105/60* (2013.01); *F25B 9/008* (2013.01); *C10M 2215/265* (2013.01); *C10N 2040/30* (2013.01); *F25B 2400/08* (2013.01); *F25B 2500/07* (2013.01); *F25B 2600/027* (2013.01)

(58) Field of Classification Search
CPC .... C09K 5/047; C09K 2205/132; C09K 5/04; F25B 37/00; F25B 31/002; F25B 13/00
See application file for complete search history.

(56) References Cited

U.S. PATENT DOCUMENTS

| | | | |
|---|---|---|---|
| 2,308,665 A | | 1/1943 | Zellhoefer et al. |
| 5,560,854 A | * | 10/1996 | Kaimai ............... C10M 105/36 252/68 |
| 6,073,454 A | | 6/2000 | Spauschus et al. |
| 6,112,547 A | | 9/2000 | Spauschus et al. |
| 6,267,907 B1 | | 7/2001 | Tolfa et al. |
| 6,415,614 B1 | | 7/2002 | Greenfield et al. |
| 6,526,764 B1 | | 3/2003 | Singh et al. |
| 9,090,806 B2 | | 7/2015 | Takigawa et al. |
| 9,885,002 B2 | | 2/2018 | Rebrovic |
| 2010/0037648 A1 | * | 2/2010 | Kaneko ............... C10M 169/04 62/468 |
| 2014/0245761 A1 | * | 9/2014 | Dixon .................... C09K 5/045 62/84 |
| 2017/0314825 A1 | * | 11/2017 | Scancarello ............ F25B 15/02 |
| 2018/0094206 A1 | * | 4/2018 | Kaneko ............... C10M 169/04 |
| 2019/0106645 A1 | * | 4/2019 | Aoki .................. C10M 101/025 |

FOREIGN PATENT DOCUMENTS

| | | |
|---|---|---|
| JP | 2002174462 A | 6/2002 |
| WO | WO-2011082003 A1 | 7/2011 |

OTHER PUBLICATIONS

International Search Report regarding Application No. PCT/US2020/030710 dated Aug. 24, 2020.

(Continued)

*Primary Examiner* — John R Hardee
(74) *Attorney, Agent, or Firm* — Harness, Dickey & Pierce, P.L.C.

(57) ABSTRACT

A compressor including a refrigerant and a lubricant, wherein the lubricant comprises at least one compound selected from the group consisting of a mono-tertiary amine, a di-tertiary amine, a tri-tertiary amine, and a tetra-tertiary amine.

17 Claims, 5 Drawing Sheets

(56) References Cited

OTHER PUBLICATIONS

Written Opinion of the Isa regarding Application No. PCT/US2020/030710 dated Aug. 24, 2020.
Samuel Pereira dos Santos, "Comparative Study of Amine Solutions used in $CO_2$ Absorption/Desorption Cycles," ISEL, Sep. 2013, pp. 1-65.
Edfeldt, Johan, "Evaluation of New Amine Based Systems for Carbon Dioxide Absorption," pp. 1-7.

* cited by examiner

CARBON DIOXIDE REFRIGERANT SYSTEM

FIELD

The present disclosure relates to a carbon dioxide refrigerant system.

BACKGROUND

This section provides background information related to the present disclosure which is not necessarily prior art.

Because carbon dioxide (R744) has a low global warming potential (GWP) of only 1 and no ozone-depleting potential at all (ODP of zero), it makes an excellent environmentally friendly refrigerant as compared to hydrofluorocarbons, hydrofluoroolefins, and other less environmentally sound refrigerants. However, the pressures required to liquefy carbon dioxide prove to be too high for use in conventional heating and cooling systems. To avoid high pressures in a refrigeration cycle, carbon dioxide can be used along with a so-called co-fluid or mixture of co-fluids.

In operation of a heating, ventilation, air conditioning and refrigeration (HVAC&R) system using carbon dioxide and a co-fluid, carbon dioxide refrigerant is absorbed into and desorbed out of the co-fluid. For example, carbon dioxide is adsorbed and the pressure lowered during compression and flow through a condenser or absorber. Subsequent flow through an expansion device and evaporator requires a desirable release (desorption) of a portion of the carbon dioxide refrigerant.

It has generally been observed that rates of adsorption tend to be faster than rates of desorption in co-fluid systems using carbon dioxide as refrigerant. This rate inequality can potentially lead to problems in operating the heating and cooling system. There may not be enough time for proper heat flow to the evaporator needed for cooling. And there could be an accumulation of carbon dioxide in the co-fluid due to the rate difference, causing the system to be inefficient or even inoperable. There is a continuing need for co-fluids that provide a higher rate of desorption to improve operation in cooling systems.

SUMMARY

This section provides a general summary of the disclosure, and is not a comprehensive disclosure of its full scope or all of its features.

The present disclosure provides a compressor including a refrigerant and a lubricant, wherein the lubricant comprises at least one compound selected from the group consisting of a mono-tertiary amine, a di-tertiary amine, a tri-tertiary amine, and a tetra-tertiary amine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 graphically illustrates an amount of heat flow (absorption of carbon dioxide by the co-fluid) over time when using various amine co-fluids with a carbon dioxide refrigerant;

FIG. 2 graphically illustrates the effect of amine density on absorption and desorption (enthalpy) of carbon dioxide from the amine;

Corresponding reference numerals indicate corresponding parts throughout the several views of the drawings.

DETAILED DESCRIPTION

Figure 1:
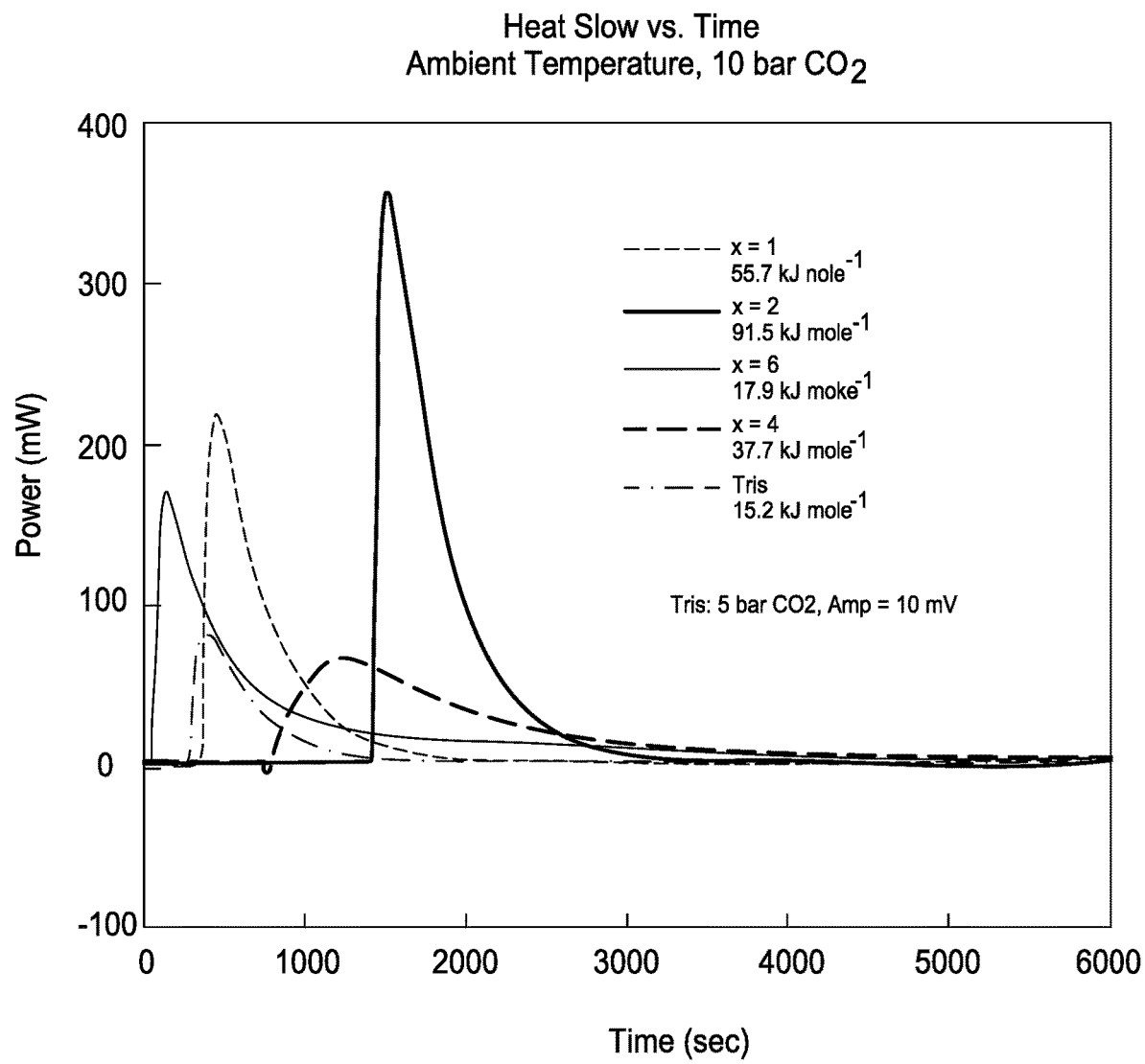

Example embodiments will now be described more fully with reference to the accompanying drawings.

The present disclosure is directed to providing a co-fluid for use in a co-fluid system where carbon dioxide is used as a refrigerant. The present disclosure is also directed to an HVAC&R system that utilizes a co-fluid system where carbon dioxide is used as a refrigerant. The co-fluid is capable of absorbing and desorbing the carbon dioxide refrigerant. Use of the co-fluids according to the present disclosure eliminates the need for high system pressures otherwise required to change the phase of the refrigerant carbon dioxide.

To be a beneficial co-fluid, the co-fluid should be a stable compound where the rate of desorption of the carbon dioxide refrigerant from the co-fluid should be about equal to the rate of absorption of the carbon dioxide refrigerant into the co-fluid. After investigation, it has been learned that amines are compounds that are of particular interest as a co-fluid in a HVAC&R system that utilizes carbon dioxide as a refrigerant. Indeed, it has been learned that amines yield high enthalpy values of absorption/desorption with a carbon dioxide refrigerant, which is a very desirable quality for a co-fluid in a carbon dioxide HVAC&R system. It should be understood, however, that not all amines may be optimal when used as a co-fluid.

More specifically, it has been learned that during absorption and desorption of the carbon dioxide refrigerant from primary and secondary amine co-fluids, carbamic acid compounds may be formed. In general, the fact that these carbamic acid compounds are formed would lead one to conclude that the rate of desorption of carbon dioxide from the primary or secondary amine co-fluid would be much slower than the rate of absorption, and would ultimately restrict the HVAC&R system from operating efficiently and providing continuous cooling or refrigeration. Carbamic acid compounds can be undesirable in an HVAC&R system from the standpoint that these compounds may be in a solid form, which can damage the compressor or inhibit fluid flow through the system.

When a tertiary amine is used as a co-fluid, carbamate compounds are formed during absorption and desorption of the carbon dioxide refrigerant from the tertiary amine co-fluid. Carbamate compounds are less stable than carbamic acid compounds. The fact that these less stable carbamate compounds are formed would lead one to conclude that the rate of desorption of carbon dioxide from a tertiary amine co-fluid would be much slower than the rate of absorption, and would ultimately restrict the HVAC&R system from operating efficiently and providing continuous cooling or refrigeration. Unexpectedly, however, it has been learned that the rate of desorption of the carbon dioxide from a tertiary amine co-fluid is substantially similar to the rate of absorption such that the tertiary amine co-fluids according to the present disclosure are beneficial co-fluids in a carbon dioxide refrigerant HVAC&R system.

Tertiary amines that may be used, either alone or in combination, as a co-fluid in an HVAC&R system according to the present disclosure may be selected from the following generic formulae. The following tertiary amines include mono-tertiary amines (i.e., the molecule includes a single tertiary amine group), di-tertiary amines (i.e., the molecule includes a pair of tertiary amine groups), tri-tertiary amines (i.e., the molecule includes three tertiary amine groups), and tetra-tertiary amines (i.e., the molecule includes a four tertiary amine group). It should be understood, however, that molecules including a greater number of tertiary amines is contemplated by the present disclosure.

A first tertiary amine is shown in the below Formula (1):

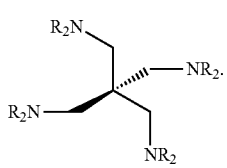
(1)

In the above Formula (1), each R group may be the same, or each R group may be different. Regardless, example R groups may include a linear or branched C1 to C10 alkyl group, an unsaturated linear or branched C1 to C10 alkyl group, a C1 to C10 alkylene group, an aromatic group, and the like. For example, R may be any of a methyl, ethyl, isopropyl, n-propyl, phenyl, vinyl, and the like. An exemplary material having Formula (1) is pentaerythritol tetrakis (dimethylamino).

A second tertiary amine is shown in the below Formula (2):

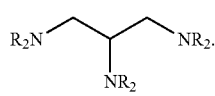
(2)

In the above Formula (2), each R group may be the same, or each R group may be different. Regardless, example R groups may include a linear or branched C1 to C10 alkyl group, an unsaturated linear or branched C1 to C10 alkyl group, a C1 to C10 alkylene group, an aromatic group, and the like. For example, R may be any of a methyl, ethyl, isopropyl, n-propyl, phenyl, vinyl, and the like. An exemplary material having Formula (2) is 1,2,3,-(dialkylamino) propane.

A third tertiary amine is shown in the below Formula (3):

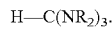
H—C(NR$_2$)$_3$. (3)

In the above Formula (3), each R group may be the same, or each R group may be different. Regardless, example R groups may include a linear or branched C1 to C10 alkyl group, an unsaturated linear or branched C1 to C10 alkyl group, a C1 to C10 alkylene group, an aromatic group, and the like. For example, R may be any of a methyl, ethyl, isopropyl, n-propyl, phenyl, vinyl, and the like.

A fourth tertiary amine is shown in the below Formula (4);

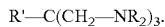
R'—C(CH$_2$—NR$_2$)$_3$. (4)

In the above Formula (4), R' and R may be the same, or R' and R may be different. Regardless, example R' and R groups may include a linear or branched C1 to C10 alkyl group, an unsaturated linear or branched C1 to C10 alkyl group, a C1 to C10 alkylene group, an aromatic group, and the like. For example, R' and R may be any of a methyl, ethyl, isopropyl, n-propyl, phenyl, vinyl, and the like. In addition, R' may be hydrogen. Example materials having Formula (4) include tris(dialkylamino)methane; and 1,1,1-tris(dialkylaminomethyl)alkanes such as 1,1,1-tris(dialkylaminomethyl)propane and 1,1,1-tris(dialkylaminomethyl) ethane.

A fifth tertiary amine is shown in the below Formula (5):

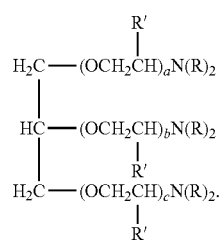
(5)

In the above Formula (5), R' and R may be the same, or R' and R may be different. Regardless, example R' and R groups may include a linear or branched C1 to C10 alkyl group, an unsaturated linear or branched C1 to C10 alkyl group, a C1 to C10 alkylene group, an aromatic group, and the like. For example, R' and R may be any of a methyl, ethyl, isopropyl, n-propyl, phenyl, vinyl, and the like. In addition, R' may be hydrogen. Example materials having Formula (5) include tri(dialkylamino)glycerol alkoxylates.

A sixth tertiary amine is shown in the below Formula (6):

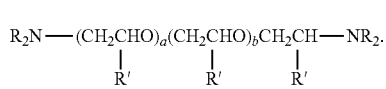
(6)

In the above Formula (6), "a" and "b" may be 1 to 10, and R', R", and R may be the same, or R', R", and R may be different. Regardless, example R', R", and R groups may include a linear or branched C1 to C10 alkyl group, an unsaturated linear or branched C1 to C10 alkyl group, a C1 to C10 alkylene group, an aromatic group, and the like. For example, R may be any of a methyl, ethyl, isopropyl, n-propyl, phenyl, vinyl, and the like. In addition, R' and R" may be hydrogen. Example materials having Formula (6) include di(dialkylamino)glycerol alkoxylates.

A seventh tertiary amine is shown in the below Formula (7):

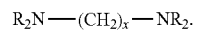
R$_2$N—(CH$_2$)$_x$—NR$_2$. (7)

In the above Formula (7), X is 1 to 10, and each R group may be the same, or each R group may be different.

Regardless, example R groups may include a linear or branched C1 to C10 alkyl group, an unsaturated linear or branched C1 to C10 alkyl group, a C1 to C10 alkylene group, an aromatic group, and the like. For example, R may be any of a methyl, ethyl, isopropyl, n-propyl, phenyl, vinyl, and the like. Example materials having a structure according to Formula (7) include di(alkylamino)alkanes, and materials such as tetramethyl ethylene diamine.

An eighth tertiary amine is shown in the below Formula (8)

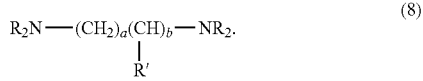
(8)

In the above Formula (8), a and b can be 1 to 10, and R' and R may be the same, or R' and R may be different. Regardless, example R' and R groups may include a linear or branched C1 to C10 alkyl group, an unsaturated linear or branched C1 to C10 alkyl group, a C1 to C10 alkylene group, an aromatic group, and the like. For example, R' and R may be any of a methyl, ethyl, isopropyl, n-propyl, phenyl, vinyl, and the like. In addition, R' may be hydrogen.

A ninth tertiary amine is shown in the below Formula (9):

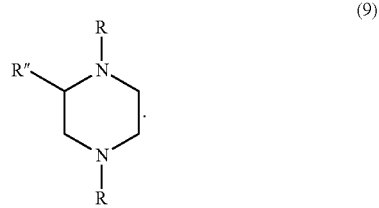
(9)

In the above Formula (9), a piperazinal-type tertiary amine is illustrated. R" and R may be the same, or R" and R may be different. Regardless, example R" and R groups may include a linear or branched C1 to C10 alkyl group, an unsaturated linear or branched C1 to C10 alkyl group, a C1 to C10 alkylene group, an aromatic group, and the like. For example, R" and R may be any of a methyl, ethyl, isopropyl, n-propyl, phenyl, vinyl, and the like. In addition, R" may be hydrogen.

A tenth tertiary amine is shown in the below Formula (10):

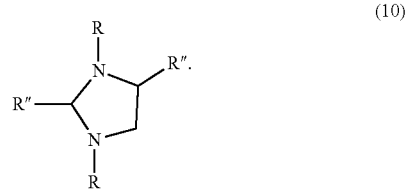
(10)

In the above Formula (10), an imidazolidene-type tertiary amine is illustrated. R" and R may be the same, or R" and R may be different. Regardless, example R" and R groups may include a linear or branched C1 to C10 alkyl group, an unsaturated linear or branched C1 to C10 alkyl group, a C1 to C10 alkylene group, an aromatic group, and the like. For example, R" and R may be any of a methyl, ethyl, isopropyl, n-propyl, phenyl, vinyl, and the like. In addition, R" may be hydrogen.

An eleventh tertiary amine is shown in the below Formula (11):

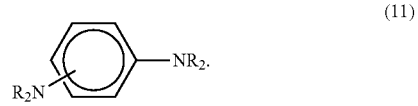
(11)

In the above Formula (11), an 1,a-(dialkylamino)benzene-type compound is illustrated where "a" may be 2, 3, or 4, and each R group may be the same, or each R group may be different. Regardless, example R groups may include a linear or branched C1 to C10 alkyl group, an unsaturated linear or branched C1 to C10 alkyl group, a C1 to C10 alkylene group, an aromatic group, and the like. For example, R may be any of a methyl, ethyl, isopropyl, n-propyl, phenyl, vinyl, and the like.

A twelfth tertiary amine is shown in the below Formula (12):

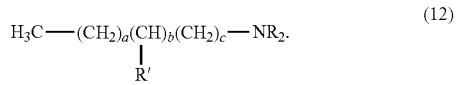
(12)

In the above Formula (12), "a," "b," and "c" can be 1 to 10, and R' and R may be the same, or R' and R may be different. Regardless, example R' and R groups may include a linear or branched C1 to C10 alkyl group, an unsaturated linear or branched C1 to C10 alkyl group, a C1 to C10 alkylene group, an aromatic group, and the like. For example, R' and R may be any of a methyl, ethyl, isopropyl, n-propyl, phenyl, vinyl, and the like. In addition, R' may be hydrogen.

A thirteenth tertiary amine is shown in the below Formula (13):

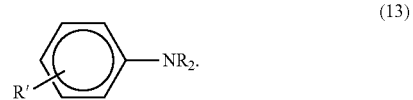
(13)

In the above Formula (13), a 1-(dialkylamino)-a-alkyl bezene-type compound is illustrated where "a" may be 2, 3, or 4, and each R' and R group may be the same, or each R' and R group may be different. Regardless, example R' and R groups may include a linear or branched C1 to C10 alkyl group, an unsaturated linear or branched C1 to C10 alkyl group, a C1 to C10 alkylene group, an aromatic group, and the like. For example, R' and R may be any of a methyl, ethyl, isopropyl, n-propyl, phenyl, vinyl, and the like. In addition, R' may be hydrogen.

Lastly, a fourteenth tertiary amine is shown in the below Formula (14).

(14)

In the above Formula (14), EO represents ethylene oxide.

In operation, the co-fluid(s) act as lubricant as well a carrier fluid for the refrigerant carbon dioxide. A compressor for use in the cooling circuits described herein contains any of the above-described tertiary amine co-fluids as a lubricant. In addition, it should be understood that the above-described tertiary amine co-fluids may be used in conjunction with non-amine co-fluids such as those described in U.S. Pat. No. 9,885,002 assigned to Emerson Climate Technologies, Inc., which is incorporated by reference herein in its entirety.

In operation, the co-fluid(s) absorb (resorb) and desorb refrigerant carbon dioxide as they circulate around a refrigeration or cooling circuit. At various points in the circuit, a cooling composition comprises from 50% to 99% by weight co-fluid and 1% to 50% by weight carbon dioxide.

Figure 2:
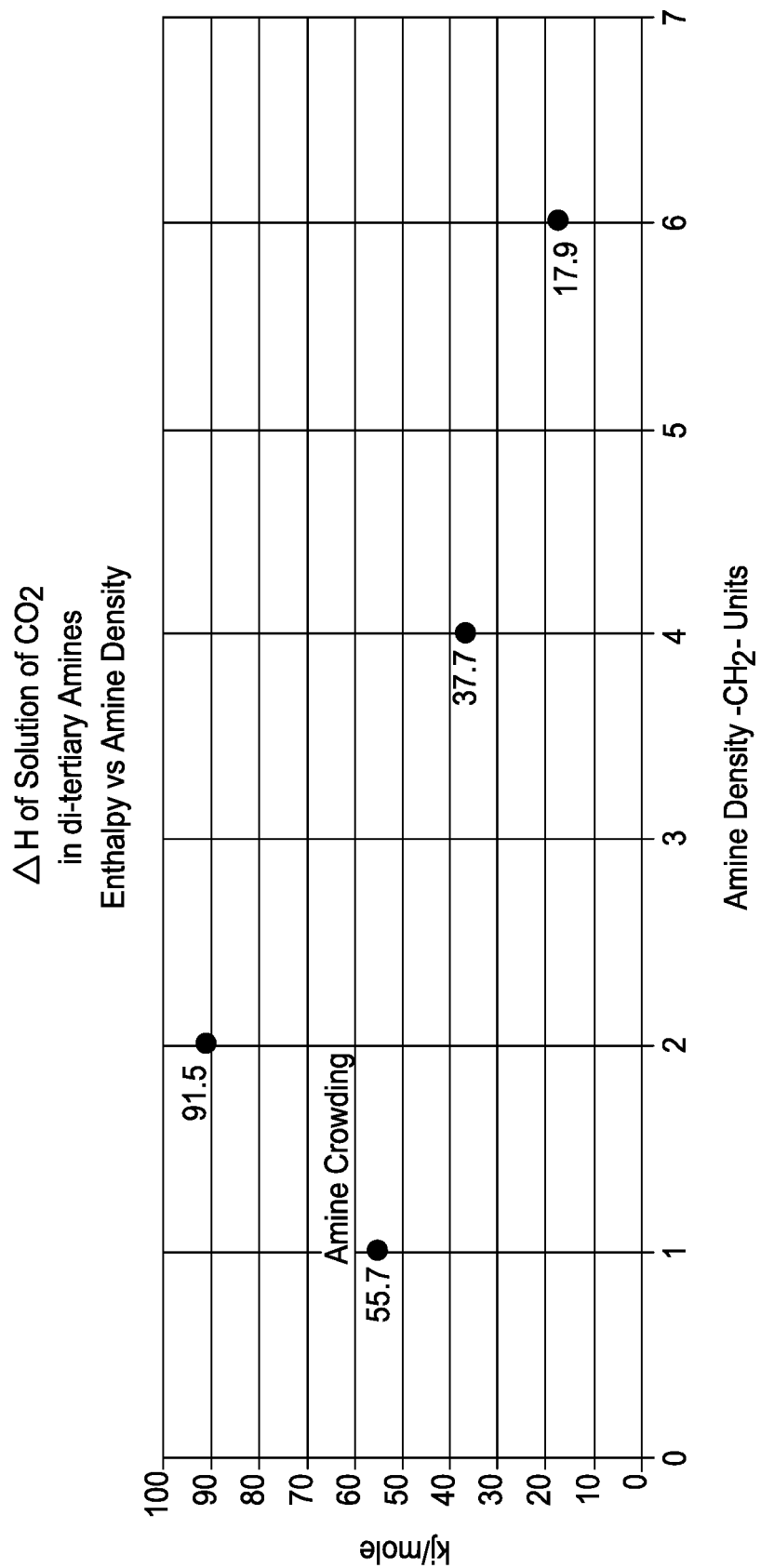

Upon testing of various tertiary amines, it was learned that when di-tertiary amines (e.g., Formulas 6 to 11 and 14) are used as a co-fluid yield, these co-fluids yield high enthalpy values of absorption/desorption with a carbon dioxide refrigerant. In particular, it was learned that compounds having a greater tertiary amine density (i.e., number of $CH_2$ groups) yield greater enthalpy value. In this regard, referring to FIG. 1, it can be seen that as the tertiary amine density increases, the enthalpy value also increases. In FIG. 1, X represents a methylene group. Thus, a compound having a pair of tertiary amines on opposing ends of a single methylene group is represented by X-1, a compound having a pair of tertiary amines on opposing ends of an ethylene group is represented by X-2, and so on. As shown in FIG. 1, as the tertiary amine density increases, the enthalpy value also increases at least to a certain extent. In particular, as shown in FIG. 2, it is believed that if the tertiary amines in the molecule are located too close together (i.e., are too closely crowded), this has an effect on the enthalpy value achieved. Regardless, it can also be seen from FIG. 2 that a compound such as that used in Formula (7) achieves a very high enthalpy value, which makes compounds having Formula (7) ideal for use as a co-fluid in carbon dioxide refrigerant HVAC&R system.

Now, a representative refrigeration cycle based on carbon dioxide as refrigerant ("vapor") operates as follows. A combination of vapor and liquid (co-fluid) is compressed in a compressor, raising the pressure and forcing some of the vapor into the liquid phase. Heat is rejected in a resorber (absorber) downstream of the compressor. This cools the mixture and causes more of the vapor to be absorbed. The remaining $CO_2$ vapor and co-fluid are further cooled in an internal heat exchanger. The cool, fully liquefied mixture is then passed through an expansion device, decreasing the pressure, dropping the temperature further, and releasing some of the $CO_2$ into the vapor phase. Heat is extracted from the refrigerated space into a desorber as the temperature of the mixture rises and further $CO_2$ escapes from the liquid phase. Finally, the fluids are further warmed in an internal heat exchanger, completing the cycle.

Figure 3:
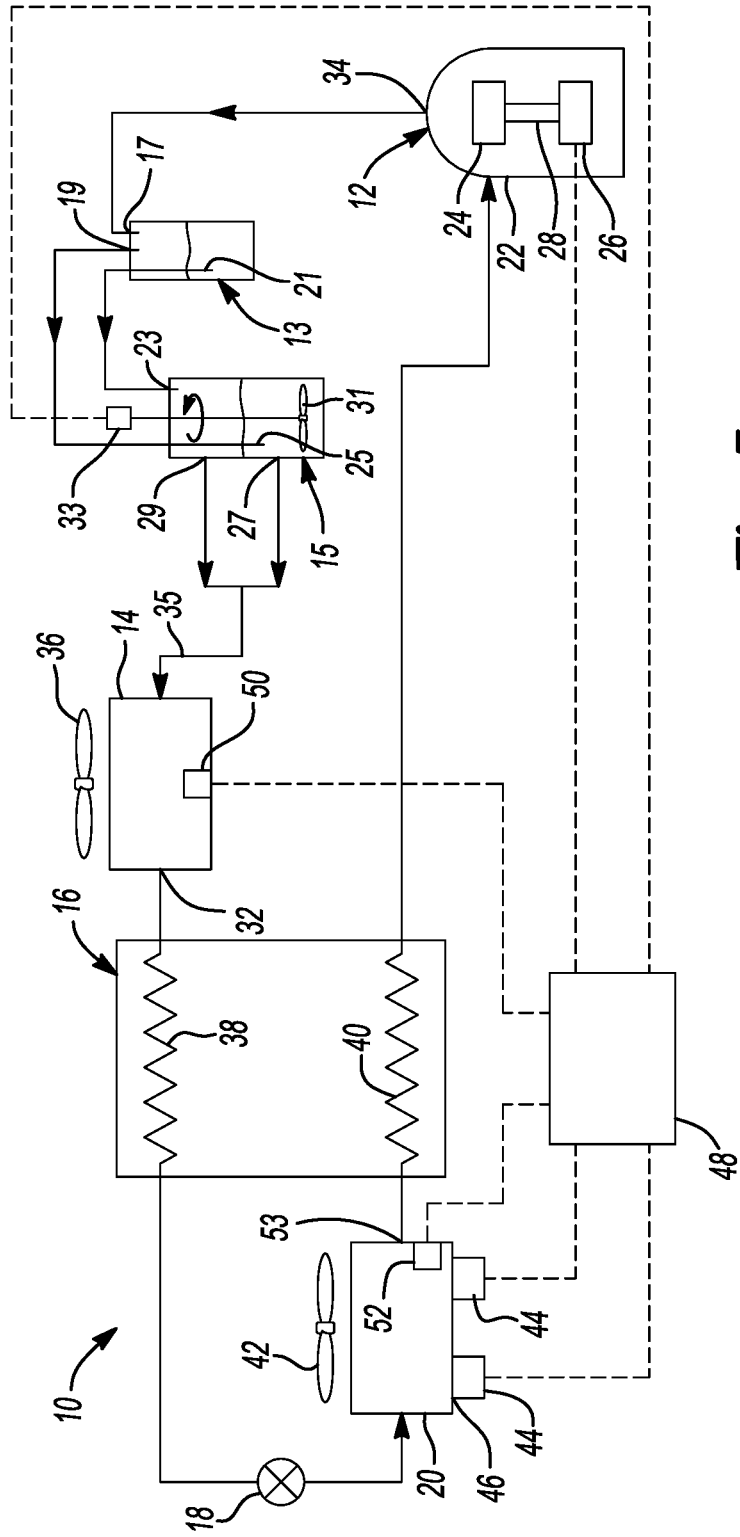
FIG. 3 is a schematic representation of a climate-control system according to the principles of the present disclosure.

With reference to FIG. 3, a binary-cycle climate-control system 10 is provided that may include a compressor 12, a liquid-vapor separator 13, an agitation vessel (e.g., a stirring and/or shaking vessel) 15, an absorber (or resorber) 14, an internal heat exchanger 16, an expansion device 18, and a desorber 20. The compressor 12 can be any suitable type of compressor, such as a scroll, rotary or reciprocating compressor, for example. The compressor 12 may include a shell 22, a compression mechanism 24 disposed within the shell 22, and a motor 26 (e.g., a fixed-speed or variable-speed motor) that drives the compression mechanism 24 via a crankshaft 28. The compressor 12 can be a fixed-capacity or variable-capacity compressor. The compressor 12 may compress a mixture of a refrigerant (e.g., carbon dioxide) and a co-fluid (e.g., a tertiary amine) and circulate the mixture throughout the system 10. Compressing the mixture of refrigerant and co-fluid raises the pressure and temperature of the mixture and causes some refrigerant to be absorbed into the co-fluid.

The liquid-vapor separator 13 may include an inlet 17, a first outlet (e.g., a gas outlet) 19, and a second outlet (e.g., a liquid outlet) 21. The inlet 17 may be fluidly coupled with an outlet 34 of the compressor 12 such that the liquid-vapor separator 13 receives the compressed mixture of refrigerant and co-fluid (e.g., the compressed mixture of refrigerant vapor and liquid co-fluid containing some dissolved refrigerant gas) from the compressor 12. The liquid co-fluid (which may contain some dissolved refrigerant gas) may settle to the bottom of the liquid-vapor separator 13, and the undissolved refrigerant vapor may remain at the top (or rise to the top) of the liquid-vapor separator 13 (i.e., above the surface of the liquid co-fluid). The liquid co-fluid may exit the liquid-vapor separator 13 through the second outlet 21 (which may be located below the surface of the liquid in the separator 13), and the refrigerant vapor may exit the liquid-vapor separator 13 through the first outlet 19 (which may be located above the surface of the liquid in the separator 13).

The agitation vessel 15 may include a first inlet 23, a second inlet 25, a first outlet 27, a second outlet 29, and an agitator 31. The first inlet 23 may be disposed at or generally near a top end of the vessel 15 and may be fluidly coupled with the second outlet 21 of the separator 13 such that liquid co-fluid from the separator 13 enters the vessel 15 through the first inlet 23. The liquid co-fluid entering the separator 13 through the first inlet 23 may fall to the bottom of the vessel 15. The second inlet 25 may be below the surface of the liquid co-fluid in the vessel 15 and may be fluidly coupled with the first outlet 19 of the separator 13 such that refrigerant vapor from the separator 13 enters the vessel 15 through the second inlet 25. In this manner, the refrigerant vapor enters the vessel 15 below the surface of the liquid co-fluid, which causes some of the refrigerant vapor entering the vessel 15 to be absorbed (or dissolved) into the liquid co-fluid.

The agitator 31 can be or include an impeller (e.g., one or rotating paddles or blades) and/or a shaker, for example, disposed below the surface of the liquid co-fluid in the vessel 15. The agitator 31 may be driven by a motor 33 and may stir or agitate the liquid co-fluid in the vessel 15 to further promote absorption of the refrigerant vapor into the liquid co-fluid.

The first outlet 27 of the vessel 15 may be disposed below the surface of the liquid co-fluid such that refrigerant vapor exits the vessel 15 through the first outlet 27. The second outlet 29 of the vessel 15 may be disposed above the surface of the liquid co-fluid such that liquid co-fluid (with refrigerant vapor dissolved therein) exits the vessel 15 through the second outlet 29. The first and second outlets 27, 29 may both be in communication with a conduit 35 such that the liquid co-fluid from the first outlet 27 and refrigerant vapor from the second outlet 29 are combined and mix with each other (further promoting absorption of the refrigerant vapor into the liquid co-fluid) in the conduit 35.

The absorber 14 may be a heat exchanger that may be fluidly coupled with the conduit 35 and may receive the compressed mixture of the refrigerant and co-fluid from the conduit 35. In configurations of the system 10 that do not include the separator 13 and vessel 15, the absorber 14 may receive the compressed mixture of the refrigerant and co-fluid directly from the compressor 12. Within the absorber 14, heat from the mixture of the refrigerant and co-fluid may be rejected to air or water for example, or some other medium. In the particular configuration shown in FIG. 1, a fan 36 may force air across the absorber 14 to cool the mixture of the refrigerant and co-fluid within the absorber 14. As the mixture of the refrigerant and co-fluid cools within the absorber 14, more refrigerant is absorbed into the co-fluid.

The internal heat exchanger 16 may include a first coil 38 and a second coil 40. The first and second coils 38, 40 are in a heat transfer relationship with each other. The first coil 38 may be fluidly coupled with the outlet 32 of the absorber 14 such that the mixture of the refrigerant and co-fluid may flow from the outlet 32 of the absorber 14 to the first coil 38. Heat from the mixture of the refrigerant and co-fluid flowing through the first coil 38 may be transferred to the mixture of the refrigerant and co-fluid flowing through the second coil 40. More refrigerant may be absorbed into the co-fluid as the mixture flows through the first coil 38.

The expansion device 18 may be an expansion valve (e.g., a thermal expansion valve or an electronic expansion valve) or a capillary tube, for example. The expansion device 18 may be in fluid communication with the first coil 38 and the desorber 20. That is, the expansion device 18 may receive the mixture of the refrigerant and co-fluid that has exited downstream of the first coil 38 and upstream of the desorber 20. As the mixture of the refrigerant and co-fluid flows through the expansion device 18, the temperature and pressure of the mixture decreases.

The desorber 20 may be a heat exchanger that receives the mixture of the refrigerant and co-fluid from the expansion device 18. Within the desorber 20, the mixture of the refrigerant and co-fluid may absorb heat from air or water, for example. In the particular configuration shown in FIG. 3, a fan 42 may force air from a space (i.e., a room or space to be cooled by the system 10) across the desorber 20 to cool the air. As the mixture of the refrigerant and co-fluid is heated within the desorber 20, refrigerant is desorbed from the co-fluid. From an outlet 53 of the desorber 20, the mixture of refrigerant and co-fluid may flow through the second coil 40 and back to the compressor 12 to complete the cycle.

Figure 4:
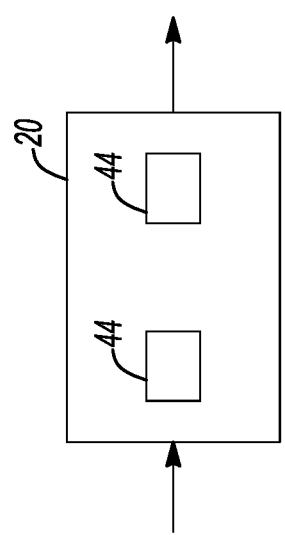
FIG. 4 is a schematic representation of an exemplary desorber that can be incorporated into the system of FIG. 3.

One or more ultrasonic transducers (i.e., vibration transducers) 44 may be attached to the desorber 20. As shown in FIG. 3, the ultrasonic transducers 44 may be mounted to an exterior surface 46 of the desorber 20. In some configurations, the ultrasonic transducers 44 are disposed inside of the desorber 20 and in contact with the mixture of refrigerant and co-fluid (as shown in FIG. 4). The ultrasonic transducers 44 can be any suitable type of transducer that produces vibrations (e.g., ultrasonic vibrations) in response to receipt of electrical current. For example, the ultrasonic transducers 44 could be piezoelectric transducers, capacitive transducers, or magnetorestrictive transducers. For example, the ultrasonic transducers 44 may have an output frequency in the range of about 20-150 kHz (kilohertz). The ultrasonic transducers 44 may (directly or indirectly) apply or transmit vibration to the mixture of refrigerant and co-fluid flowing through the desorber 20 to increase a rate of desorption of the refrigerant from the co-fluid.

The ultrasonic transducers 44 can have any suitable shape or design. For example, the ultrasonic transducers 44 may have a long and narrow shape, a flat disc shape, etc., and can be flexible or rigid. In configurations in which the ultrasonic transducers 44 are mounted to the exterior surface 46 of the desorber 20, it may be beneficial for the desorber 20 to have a minimal wall thickness at the location at which the ultrasonic transducers 44 are mounted in order to minimize attenuation of the ultrasonic vibration. Furthermore, it may be beneficial to apply the ultrasonic vibration to the mixture of the refrigerant and co-fluid at a location at which the mixture of the refrigerant and co-fluid is static or at a location of reduced or minimal flow rate of the mixture of the refrigerant and co-fluid, because fluids flowing at high rates can be more difficult to excite with ultrasonic energy.

A control module (or controller) 48 may be in communication (e.g., wired or wireless communication) with the ultrasonic transducers 44 and may control operation of the ultrasonic transducers 44. The control module 48 can control the frequency and amplitude of electrical current supplied to the ultrasonic transducers 44 (e.g., electrical current supplied to the ultrasonic transducers 44 by a battery and/or other electrical power source) to control the frequency and amplitude of the vibration that the ultrasonic transducers 44 produce. The control module 48 may also be in communication with and control operation of the motor 26 of the compressor 12, the expansion device 18, the motor 33 of the agitator 31, the fans 36, 42, and/or other components or subsystems.

As described above, applying ultrasonic vibration to the mixture of refrigerant and co-fluid increases the desorption rate. The control module 48 may control operation of the ultrasonic transducers 44 to control the desorption rate. For example, the control module 48 may control the frequency, amplitude, runtime (e.g., pulse-width-modulation cycle time), etc. of the motor 33, fans 36, 42, and/or the ultrasonic transducers 44 such that the desorption rate matches or nearly matches a rate of absorption of the refrigerant into the co-fluid that occurs upstream of the expansion device 18 (e.g., in the absorber 14 and vessel 15).

Without any excitation of the mixture of refrigeration and co-fluid, the absorption rate may be substantially greater than the desorption rate. The absorption rate may vary depending on a variety of operating parameters of the system 10 (e.g., pressure, compressor capacity, fan speed, thermal load on the system 10, type of refrigerant, type of co-fluid, etc.). In some configurations, a first sensor 50 and a second sensor 52 may be in communication with the control module 48 and may measure parameters that are indicative of absorption rate and desorption rate. For example, the first sensor 50 can be a pressure or temperature sensor that measures the pressure or temperature of the mixture of refrigerant and co-fluid within the absorber 14, and the second sensor 52 can be a pressure or temperature sensor that measures the pressure or temperature of the mixture of refrigerant and co-fluid within the desorber 20. The pressures and/or temperatures measured by the sensors 50, 52 may be indicative of absorption rate and desorption rate.

The sensors 50, 52 may communicate the pressure or temperature data to the control module 48, and the control module 48 may determine a concentration of refrigerant in the co-fluid based on the pressure or temperature data (e.g., using a lookup table or equations). The control module 48 can include an internal clock (or be in communication with an external clock) and can determine the absorption rate and desorption rate based on changes in the concentration of refrigerant in the co-fluid over a period of time. The control module 48 may control operation of the ultrasonic transducers 44 based on the absorption rate and/or the desorption rate. The control module 48 may also control operation of the compressor 12, the fans 36, 42 and/or the expansion device 18 based on the absorption and/or desorption rates and/or to control the absorption and/or desorption rates. In some configurations, the control module 48 may control the ultrasonic transducers 44 based on data from additional or alternative sensors and/or additional or alternative operating parameters.

Because the absorption rate of many refrigerants into many co-fluids is significantly faster than the desorption rate, the rate of desorption may substantially limit the capacity of the system 10. Applying ultrasonic energy (e.g., via the ultrasonic transducers 44) to the mixture of refrigerant and co-fluid unexpectedly solves the problem of slow desorption rates. It can be shown that desorption rates may increase by about 100%-900% (depending on the refrigerant type and co-fluid type) by exciting the mixture of refrigerant and co-fluid with ultrasonic energy (e.g., using one or more ultrasonic transducers 44) as compared to stirring the mixture with a propeller at 400 revolutions per minute. This increase in the desorption rate surpassed reasonable expectations of success.

Figure 5:
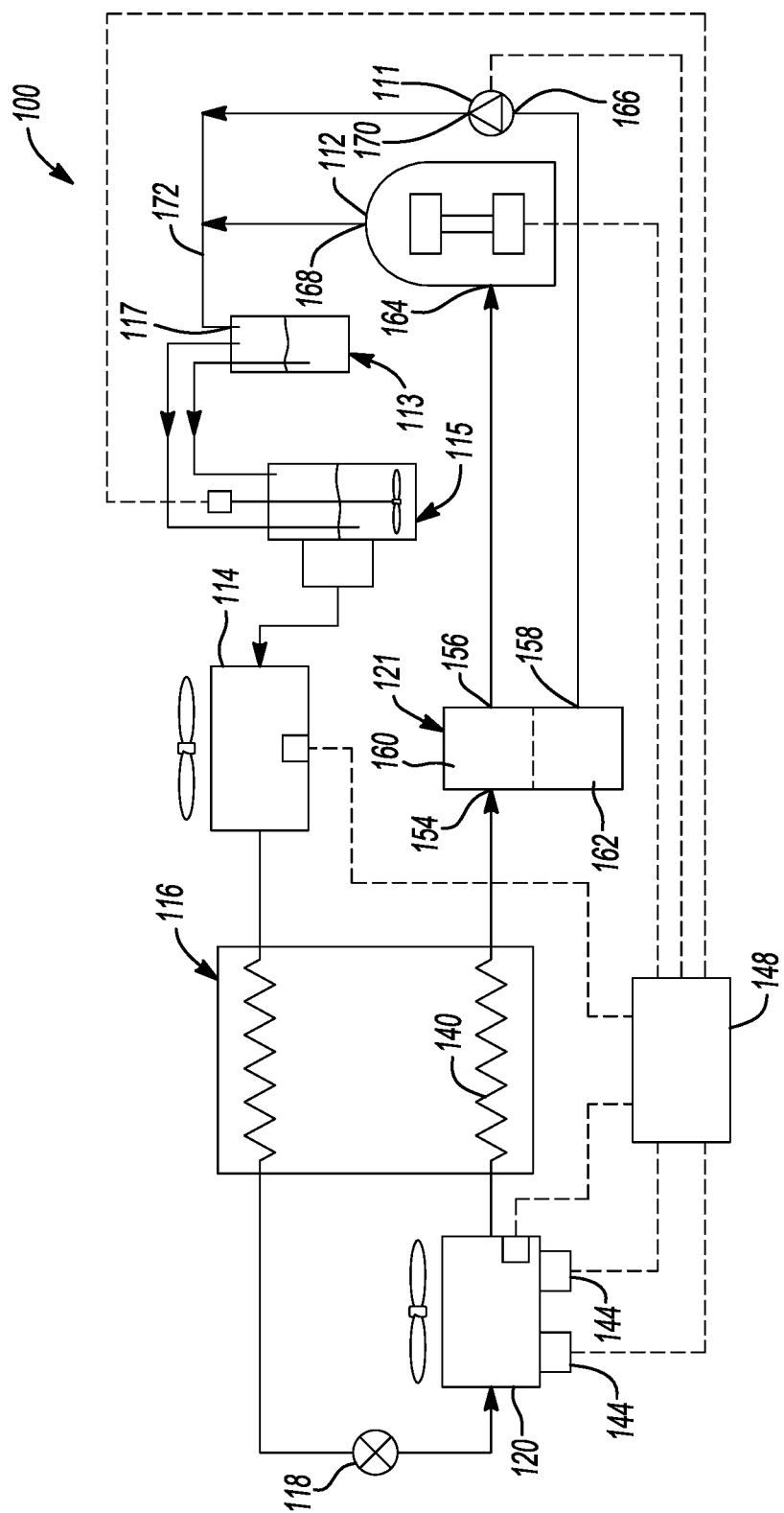
FIG. 5 is a schematic representation of another climate-control system according to the principles of the present disclosure.

Referring now to FIG. 5, another binary-cycle climate-control system 100 is provided that may include a compressor 112, a pump 111, a liquid-vapor separator 113, an agitation vessel (e.g., a stirring and/or shaking vessel) 115, an absorber 114, an internal heat exchanger 116, an expansion device 118, a desorber 120, a receiver 121, one or more ultrasonic transducers 144 and a control module 148. The structure and function of the compressor 112, liquid-vapor separator 113, agitation vessel 115, absorber 114, internal heat exchanger 116, expansion device 118, desorber 120, ultrasonic transducers 144 and control module 148 may be similar or identical to that of the compressor 12, liquid-vapor separator 13, agitation vessel 15, absorber 14, internal heat exchanger 16, expansion device 18, desorber 20, ultrasonic transducers 44 and control module 48 described above (apart from any exceptions described below). Therefore, similar features may not be described again in detail.

The receiver 121 may be fluidly coupled with the internal heat exchanger 116 (e.g., a second coil 140 of the internal heat exchanger 116), the compressor 112, and the pump 111. The receiver 121 may include an inlet 154, a refrigerant outlet 156, and a co-fluid outlet 158. The inlet 154 may receive the mixture of refrigerant and co-fluid from the second coil 140. Inside of the receiver 121, gaseous refrigerant may be separated from liquid co-fluid. That is, the co-fluid accumulates in a lower portion 162 of the receiver 121, and the refrigerant may accumulate in an upper portion 160 of the receiver 121. The refrigerant may exit the receiver 121 through the refrigerant outlet 156, and the co-fluid may exit the receiver 121 through the co-fluid outlet 158. The refrigerant outlet 156 may be fluidly coupled with a suction fitting 164 of the compressor 112 such that refrigerant is drawn into the compressor 112 for compression therein. The co-fluid outlet 158 may be fluidly coupled with an inlet 166 of the pump 111 so that the co-fluid is drawn into the pump 111. Outlets 168, 170 of the compressor 112 and pump 111, respectively, are fluidly coupled with an inlet 117 of the separator 113 via a conduit 172 or with an inlet of the absorber 114 such that refrigerant discharged from the compressor 112 and co-fluid discharged from the pump 111 can be recombine in the vessel 115, in the absorber 114 and/or in the conduit 172 that feeds the separator 113 or the absorber 114.

Figure 6:
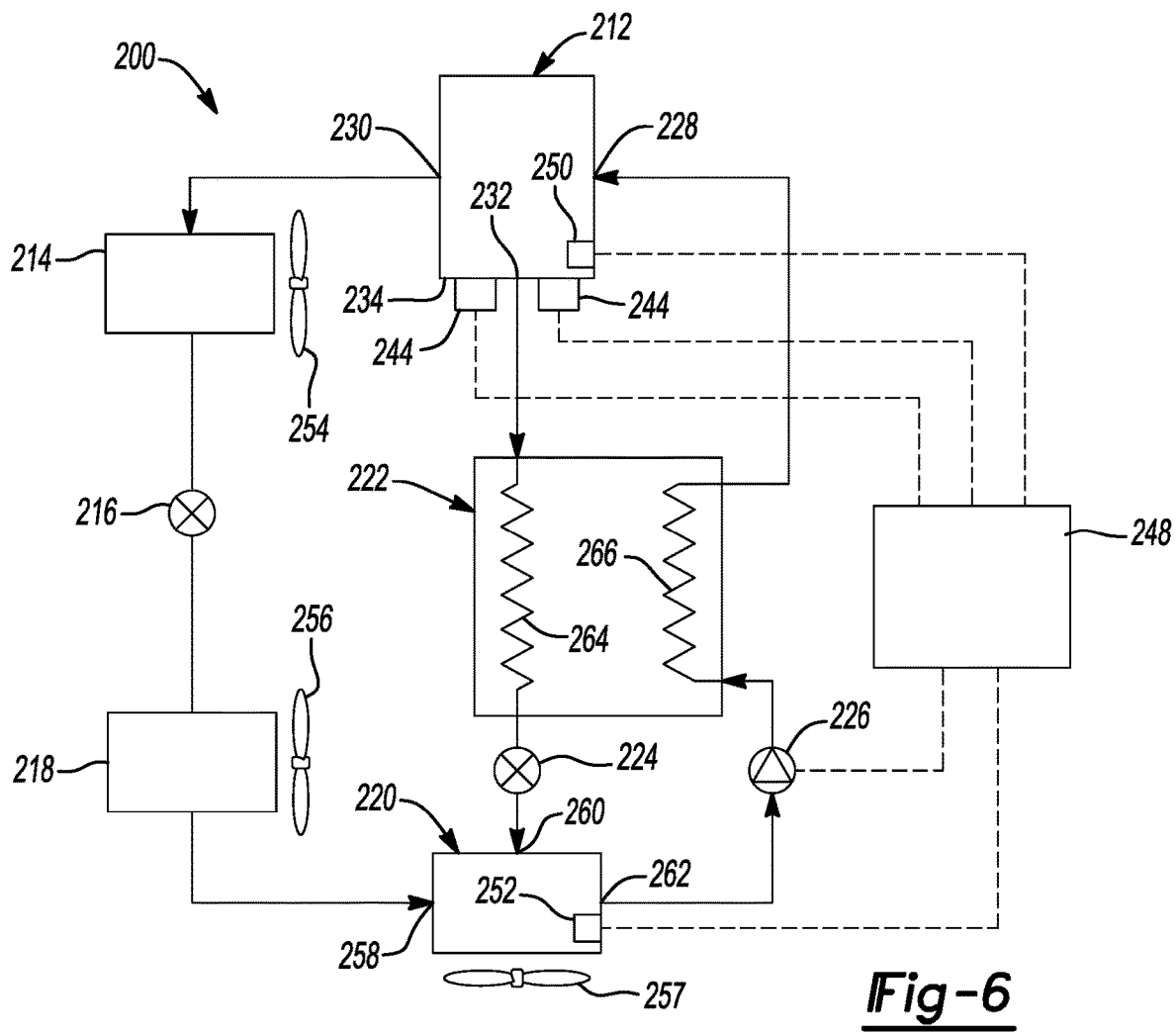
FIG. 6 is a schematic representation of yet another climate-control system according to the principles of the present disclosure.

With reference to FIG. 6, an absorption-cycle climate-control system 200 is provided that may include a vessel 212 (e.g., a generator), a condenser 214, a first expansion device 216, an evaporator 218, an absorber 220, an internal heat exchanger 222, a second expansion device 224, and a pump 226. The vessel 212 may include an inlet 228, a refrigerant outlet 230, and a co-fluid outlet 232. The inlet 228 may receive a mixture of refrigerant and co-fluid (i.e., with the refrigerant absorbed into the co-fluid).

The vessel 212 may be heated by any available heat source (e.g., a burner, boiler or waste heat from another system or machine) (not shown). In some configurations, the vessel 212 may absorb heat from a space to be cooled (e.g., the space to be cooled within a refrigerator, freezer, etc.). As heat is transferred to the mixture of refrigerant and co-fluid within the vessel 212, the vapor refrigerant desorbs from the co-fluid so that the refrigerant can separate from the co-fluid. The refrigerant may exit the vessel 212 through the refrigerant outlet 230, and the co-fluid may exit the vessel 212 through the co-fluid outlet 232.

Figure 7:
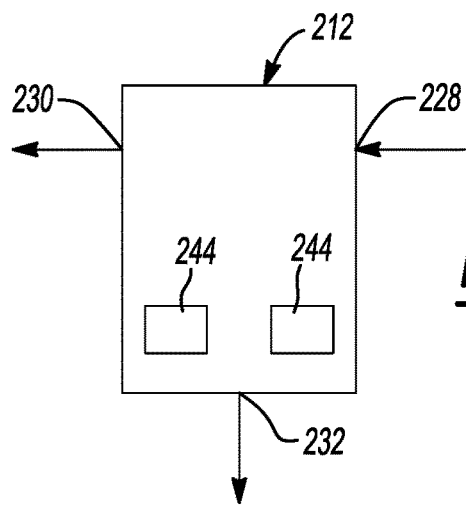
FIG. 7 is a schematic representation of a generator that can be incorporated into the system of FIG. 6.

One or more ultrasonic transducers 244 may be attached to the vessel 212. As shown in FIG. 6, the ultrasonic transducers 244 may be mounted to an exterior surface 234 of the vessel 212. In some configurations, the ultrasonic transducers 244 are disposed inside of the vessel 212 and in contact with the mixture of refrigerant and co-fluid (as shown in FIG. 7). The structure and function of the ultrasonic transducers 244 may be similar or identical to that of the ultrasonic transducers 44 described above. As described above, the ultrasonic transducers 244 produce ultrasonic vibration that is transmitted to the mixture of refrigerant and co-fluid to increase the desorption rate of the refrigerant from the co-fluid. In some configurations, ultrasonic vibration may be used to produce a desired amount of desorption without adding heat from another source. In some configurations, ultrasonic vibration and the addition of heat may further accelerate the desorption rate.

As described above, a control module 248 may be in communication with and control operation of the ultrasonic transducers 244 to increase the desorption rate to a desired level (e.g., to a level matching a rate of absorption). The structure and function of the control module 248 may be similar or identical to that of the control module 48. The control module 248 may be in communication with sensors 250, 252 and may control operation of the ultrasonic transducers 244 based on pressure and/or temperature data received from the sensors 250, 252. The sensor 250 may be disposed within the vessel 212 and may measure a pressure or temperature of the mixture of refrigerant and co-fluid therein. The sensor 252 may be disposed within the absorber 220 and may measure a pressure or temperature of the mixture of refrigerant and co-fluid therein. The control module 248 may also be in communication with and control operation of the pump 226, the expansion devices 216, 224 and/or fans 254, 256, 257.

The condenser 214 is a heat exchanger that receives refrigerant from the refrigerant outlet 230 of the vessel 212. Within the condenser 214, heat from the refrigerant may be rejected to air or water for example, or some other medium. In the particular configuration shown in FIG. 6, the fan 254 may force air across the condenser 214 to cool the refrigerant within the condenser 214.

The expansion devices 216, 224 may be expansion valves (e.g., thermal expansion valves or electronic expansion valves) or capillary tubes, for example. The first expansion device 216 may be in fluid communication with the condenser 214 and the evaporator 218. The evaporator 218 may receive expanded refrigerant from the expansion device 216. Within the evaporator 218, the refrigerant may absorb heat from air or water, for example. In the particular configuration shown in FIG. 6, the fan 256 may force air from a space (i.e., a room or space to be cooled by the system 200) across the evaporator 218 to cool the air.

The absorber 220 may include a refrigerant inlet 258, a co-fluid inlet 260, and an outlet 262. The refrigerant inlet 258 may receive refrigerant from the evaporator 218. The co-fluid inlet 260 may receive co-fluid from the second expansion device 224. Refrigerant may absorb into the co-fluid within the absorber 220. The fan 257 may force air across the absorber 220 to cool the mixture of refrigerant and co-fluid and facilitate absorption.

Like the internal heat exchanger 16, the internal heat exchanger 222 may include a first coil 264 and a second coil 266. The first coil 264 may receive co-fluid from the co-fluid outlet 232 of the vessel 212. The co-fluid may flow from the first coil 264 through the second expansion device 224 and then into the absorber 220 through the co-fluid inlet 260.

The mixture of refrigerant and co-fluid may exit the absorber 220 through the outlet 262, and the pump 226 may pump the mixture through the second coil 266. The mixture of refrigerant and co-fluid flowing through the second coil 266 may absorb heat from the co-fluid flowing through the first coil 264. From the second coil 266, the mixture of refrigerant and co-fluid may flow back into the vessel 212 through the inlet 228.

It will be appreciated that the climate-control systems 10, 100, 200 can be used to perform a cooling function (e.g., refrigeration or air conditioning) or a heating function (e.g., heat pump).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor including a refrigerant and a lubricant, wherein the lubricant comprises at least one compound selected from the group consisting of:

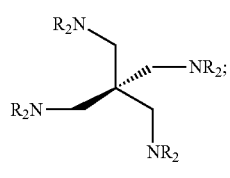

(1)

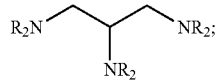

(2)

H—C(NR$_2$)$_3$; (3)

R'—C(CH$_2$—NR$_2$)$_3$; (4)

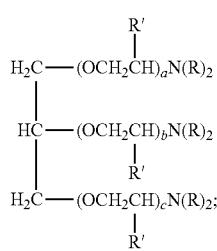

(5)

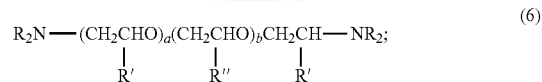

(6)

R$_2$N—(CH$_2$)$_x$—NR$_2$; (7)

(8)

(9)

(10)

(11)

H$_3$C—(CH$_2$)$_a$(CH)$_b$(CH$_2$)$_c$—NR$_2$; (12)

 and (13)

(CH$_3$)$_2$N—(EO)$_3$—N(CH$_3$)$_2$, (14)

wherein in each of the above formulae R', R", and R may be the same, or R', R", and R may be different, and each of R', R", and R are selected from the group consisting of a linear or branched C1 to C10 alkyl group, an unsaturated linear or branched C1 to C10 alkyl group, a C1 to C10 alkylene group, and an aromatic group;

wherein in Formulae (5), (6), (8), and (12), a, b, and c are an integer in the range of 1 to 10;

wherein in Formula (7), x is an integer in the range of 1 to 10;

wherein Formula (11) represents a 1,a-(dialkylamino) benzene-type compound where "a" may be 2, 3, or 4; and wherein Formula (13) represents a 1-(dialkylamino)-a-alkyl benzene-type compound where "a" may be 2, 3, or 4.

2. The compressor according to claim 1, wherein the lubricant includes at least one compound having Formula (7).

3. The compressor according to claim 2, wherein x equals 2.

4. A climate-control system comprising:
a compressor compressing a carbon-dioxide refrigerant;
an absorber disposed downstream of the compressor and receiving a mixture of the carbon dioxide refrigerant and a co-fluid;
an expansion device in fluid communication with the absorber and disposed downstream of the absorber; and a desorber in fluid communication with the expansion device and disposed downstream of the expansion device, wherein the co-fluid is at least one compound selected from the group consisting of

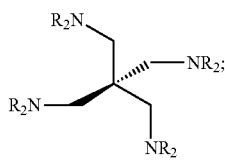
(1)

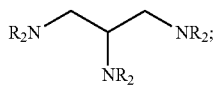
(2)

H—C(NR₂)₃; (3)

R'—C(CH₂—NR₂)₃; (4)

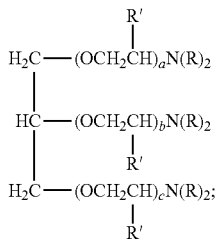
(5)

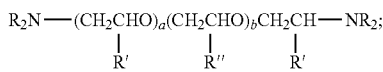
(7)

R₂N—(CH₂)ₓ—NR₂; (8)

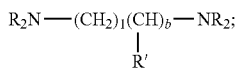
(9)

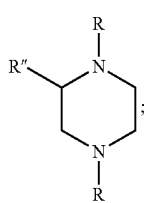
(10)

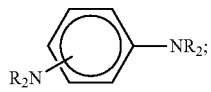
(11)

H₃C—(CH₂)ₐ(CH)ᵦ(CH₂)ᶜ—NR₂; (12)

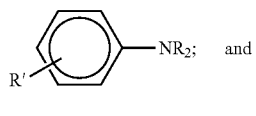
(13)

(CH₃)₂N—(EO)₃—N(CH₃)₂, (14)

wherein in each of the above formulae R', R", and R may be the same, or R', R", and R may be different, and each of R', R", and R are selected from the group consisting of a linear or branched C1 to C10 alkyl group, an unsaturated linear or branched C1 to C10 alkyl group, a C1 to C10 alkylene group, and an aromatic group;

wherein in Formulae (5), (6), (8), and (12), a, b, and c are an integer in the range of 1 to 10;

wherein in Formula (7), x is an integer in the range of 1 to 10;

wherein Formula (11) represents a 1,a-(dialkylamino) benzene-type compound where "a" may be 2, 3, or 4; and wherein Formula (13) represents a 1-(dialkylamino)-a-alkyl benzene-type compound where "a" may be 2, 3, or 4.

5. The climate-control system according to claim 4, further comprising an ultrasonic transducer configured to transmit a vibration to the carbon-dioxide refrigerant and the co-fluid at a location downstream of the expansion device and upstream of the compressor, wherein the ultrasonic transducer is attached to the desorber and transmits vibration to the carbon dioxide refrigerant and the co-fluid within the desorber to increase a rate of desorption.

6. The climate-control system according to claim 5, further comprising a control module in communication with the ultrasonic transducer and for controlling operation of the ultrasonic transducer to adjust the rate of desorption.

7. The climate-control system of claim 6, wherein the control module controls operation of the ultrasonic transducer based on a rate of absorption of the refrigerant into the co-fluid.

8. The climate-control system of claim 7, further comprising a first sensor measuring a first parameter of a mixture of refrigerant and co-fluid within the absorber and a second sensor measuring a second parameter of the mixture of refrigerant and co-fluid within the desorber, the first and second sensors communicating with the control module.

9. The climate-control system of claim 8, wherein the control module determines the rate of absorption based on data received from the first sensor and determines the rate of desorption based on data received from the second sensor, and wherein the control module controls operation of the ultrasonic transducer based on a difference between the rate of absorption and the rate of desorption.

10. The climate-control system of claim 9, wherein the control module controls operation of the ultrasonic transducer to match the rate of desorption with the rate of absorption.

11. The climate-control system of claim 5, wherein the ultrasonic transducer is disposed within the desorber.

12. The climate-control system of claim 5, wherein the ultrasonic transducer is in contact with the refrigerant and co-fluid within the desorber.

13. The climate-control system of claim 5, wherein the ultrasonic transducer is mounted to an exterior surface of the desorber.

14. The climate-control system of claim 4, further comprising a heat exchanger having a first coil and a second coil, the first coil receiving a mixture of refrigerant and co-fluid from the absorber, the second coil receiving the mixture of refrigerant and co-fluid from the desorber, wherein the mixture of refrigerant and co-fluid within the second coil absorbs heat from the mixture of refrigerant and co-fluid within the first coil.

15. The climate-control system of claim 4, wherein a liquid-vapor separator and an agitation vessel are disposed between and in fluid communication with the compressor and the absorber.

16. The climate-control system of claim 4, wherein the co-fluid includes at least the compound having Formula (7).

17. The climate-control system according to claim 16, wherein x equals 2.

* * * * *